March 7, 1933.  J. Y. OHTA  1,900,845
SIGNAL
Filed Dec. 28, 1931
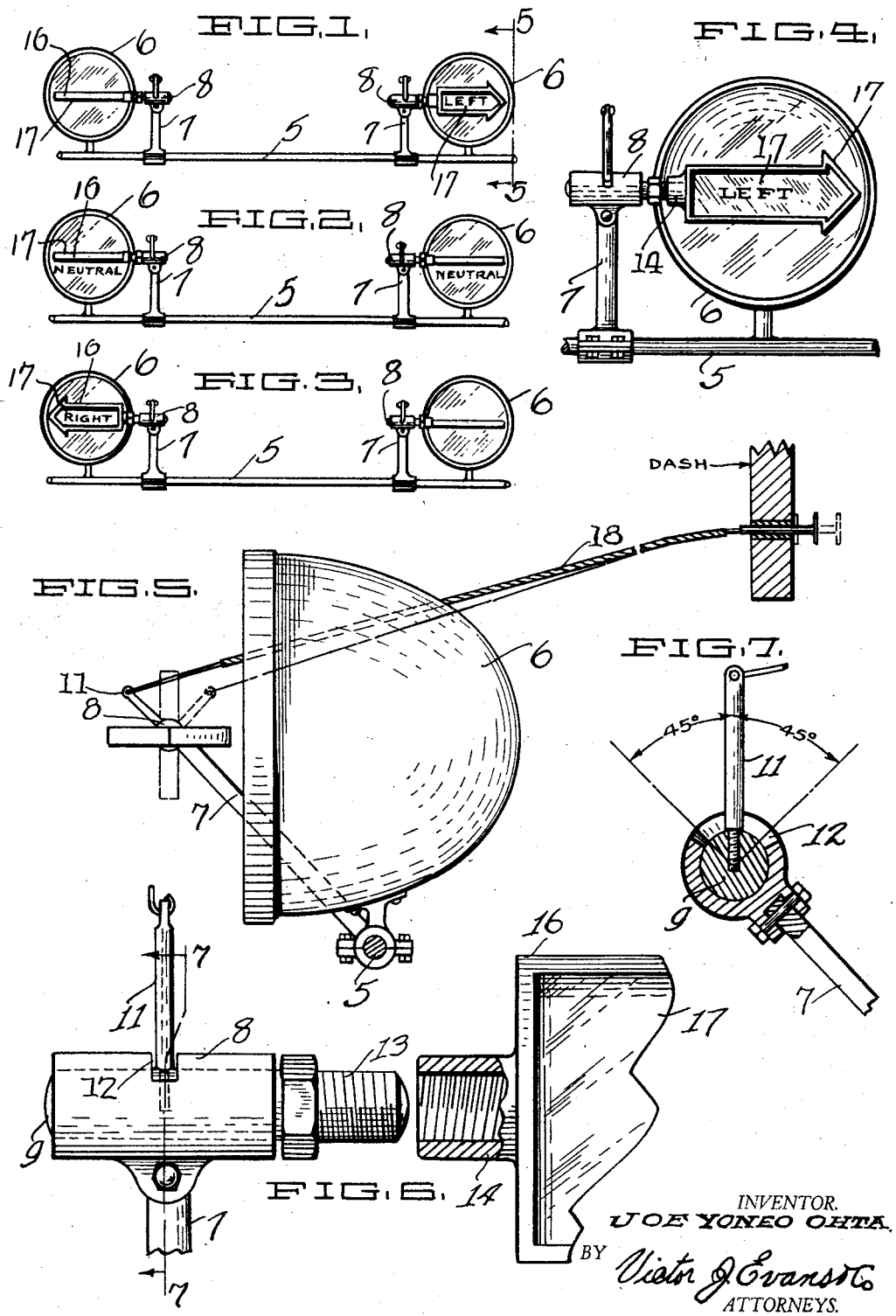
INVENTOR.
JOE YONEO OHTA
BY Victor J. Evans & Co
ATTORNEYS.

Patented Mar. 7, 1933

1,900,845

UNITED STATES PATENT OFFICE

JOE YONEO OHTA, OF TERMINAL ISLAND, CALIFORNIA

SIGNAL

Application filed December 28, 1931. Serial No. 583,547.

This invention relates to improvements in signals.

The principal object of the invention is to provide means whereby a driver of a motor vehicle may designate the direction in which he is going to proceed in turning either to the right or left.

A further object is to produce a device which is neat in appearance and one which will not detract from the appearance of the vehicle.

Another object is to produce a device which may be attached to any motor vehicle now in use, without materially altering its construction.

A still further object is to produce a device which will conform to the laws of the various States.

Other objects and advantages will be apparent during the course of the following description.

In the accompanying drawing forming a part of this specification and in which like numerals are employed to designate like parts throughout the same, Figs. 1, 2, and 3 designate front elevations of automobile headlights, having my invention applied thereto, and indicating a left turn, neutral position or a right hand turn, Fig. 4 is an enlarged detail front elevation of a single light having my signal applied thereto, Fig. 5 is an enlarged detail side elevation of a light showing the manner in which the same may be operated, Fig. 6 is an enlarged detail view of the signal mounting, and Fig. 7 is a cross sectional view taken on the line 7—7 of Fig. 6.

My device consists of a bracket positioned adjacent the headlights and as both brackets are identical, that is the right-hand bracket and the left-hand bracket, but one will be described.

In the accompanying drawing wherein for the purpose of illustration is shown a preferred embodiment of my invention, the numeral 5 designates a suitable support which may be any portion of a motor vehicle positioned adjacent the headlights 6. At 7 I have shown a bracket having a head 8 in which is rotatably positioned a pin 9 having a lever 11 extending through a ninety degree slot 12 formed in the head 8. This pin 9 has a threaded extremity 13 which is adapted to enter a threaded boss 14 formed upon a signal frame 16, which frame is preferably in the form of an arrow and contains a glass 17 upon which is printed either the words "Left" or "Right", as the case may be.

Any means may be employed for actuating the lever 11. In the present instance, I have shown a Bowden wire 18 which may be operated from the dash board or any other convenient location adjacent the driver.

The result of this construction is that when the lever 11 is moved from its forward position to its backward position, the frame 16 will be rotated through an arc of ninety degrees and consequently the plate 17 will be illuminated and thus display the wording upon the sign.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention I claim:—

A direction indicator for motor vehicles adapted to be positioned forwardly of and in proximity to a headlight of the vehicle comprising a bracket, a cylindrical head secured to said bracket and having a slot formed therein, a spindle rotatably mounted in said head and having a threaded extremity, a signalling device detachably secured to said threaded extremity and embodying in its construction a frame, and a signal indicia bearing plate carried by said frame, a lever secured to said spindle and movable in the slot of said head, and manually controlled means connected to said lever.

In testimony whereof I affix my signature.

JOE YONEO OHTA.